United States Patent
Theuerkorn

(10) Patent No.: US 10,261,268 B2
(45) Date of Patent: Apr. 16, 2019

(54) STRAIN RELIEF ASSEMBLY FOR A FIBER OPTIC CONNECTOR

(71) Applicant: Corning Optical Communications LLC, Hickory, NC (US)

(72) Inventor: Thomas Theuerkorn, Hickory, NC (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/810,981

(22) Filed: Nov. 13, 2017

(65) Prior Publication Data

US 2018/0136427 A1 May 17, 2018

Related U.S. Application Data

(60) Provisional application No. 62/421,479, filed on Nov. 14, 2016.

(51) Int. Cl.
*G02B 6/38* (2006.01)
*G02B 6/44* (2006.01)

(52) U.S. Cl.
CPC ......... *G02B 6/3887* (2013.01); *G02B 6/4477* (2013.01)

(58) Field of Classification Search
None
See application file for complete search history.

(56) References Cited

U.S. PATENT DOCUMENTS

| | | | |
|---|---|---|---|
| 4,367,967 A | 1/1983 | Albert, Jr. | |
| 5,329,603 A | 7/1994 | Watanabe et al. | |
| 5,461,690 A * | 10/1995 | Lampert | G02B 6/3807 385/100 |
| 5,781,681 A | 7/1998 | Manning | |
| 5,915,056 A * | 6/1999 | Bradley | G02B 6/3887 385/76 |
| 6,672,774 B2 * | 1/2004 | Theuerkorn | G02B 6/3887 385/86 |
| 6,817,780 B2 * | 11/2004 | Ngo | G02B 6/3887 385/86 |
| 7,695,197 B2 * | 4/2010 | Gurreri | G02B 6/3887 385/69 |
| 8,376,632 B2 | 2/2013 | Blackburn et al. | |
| 9,551,842 B2 * | 1/2017 | Theuerkorn | |
| 2002/0181893 A1 | 12/2002 | White et al. | |
| 2003/0095754 A1 * | 5/2003 | Matsumoto | G02B 6/3885 385/86 |

(Continued)

OTHER PUBLICATIONS

EP17201750 Search Report dated Mar. 27, 2018, European Patent Office, 8 pgs.

*Primary Examiner* — Michael Stahl
(74) *Attorney, Agent, or Firm* — Adam R. Weeks

(57) ABSTRACT

A strain relief assembly for a fiber optic connector includes a support having a front end, a back end, and an internal cavity extending between the front end and the back end. The strain relief assembly also includes a boot extending over at least a portion of the support and rearwardly from the back end. The boot is less rigid than the support and includes an internal passageway communicating with the internal cavity of the support. Additionally, the boot is arranged about a central axis. The boot bulges radially outward from the central axis as the boot extends over the back end of the support.

20 Claims, 8 Drawing Sheets

(56) References Cited

U.S. PATENT DOCUMENTS

| | | | |
|---|---|---|---|
| 2004/0005123 A1* | 1/2004 | Seo | G02B 6/3887 |
| | | | 385/86 |
| 2004/0234209 A1* | 11/2004 | Cox | G02B 6/3887 |
| | | | 385/86 |
| 2006/0280408 A1* | 12/2006 | Anderson | G02B 6/3885 |
| | | | 385/54 |
| 2012/0257858 A1 | 10/2012 | Nhep | |
| 2014/0328560 A1* | 11/2014 | Ahmed | G02B 6/4471 |
| | | | 385/87 |
| 2015/0036982 A1 | 2/2015 | Nhep et al. | |
| 2016/0209602 A1 | 7/2016 | Theuerkorn | |

* cited by examiner

STRAIN RELIEF ASSEMBLY FOR A FIBER OPTIC CONNECTOR

CROSS-REFERENCE TO RELATED APPLICATION

This application claims the benefit of priority under 35 U.S.C. § 119 of U.S. Provisional Application Ser. No. 62/421,479 filed on Nov. 14, 2016, the content of which is relied upon and incorporated herein by reference in its entirety.

BACKGROUND

This disclosure relates generally to optical connectivity, and more particularly to strain relief assemblies for fiber optic connectors and fiber optic cable assemblies.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another connector (e.g., in an adapter), an optical fiber in the ferrule is positioned in a known, fixed location relative to the housing. This allows an optical connection to be established when the optical fiber is aligned with another optical fiber provided in the mating connector.

The housing and connector bodies (e.g., a retention/crimp body) of a fiber optic connector are often relatively rigid components so that the fiber optic connector can withstand a variety of forces during handling and use without affecting the optical connection that may be or has been established. Having a rigid components, however, presents design challenges elsewhere. For example, fiber optic cables upon which fiber optic connectors are installed are typically much less rigid than the connector bodies of the fiber optic connectors. The rapid transition from high stiffness to low stiffness may result in stress concentrations where the cable meets the connector body. Radial loads applied to the cable may then result in the cable bending (e.g., where the stresses are concentrated) beyond a minimum bend radius that must not be exceeded for the cable to function properly.

To address the above-mentioned challenge, a fiber optic connector typically includes a a flexible, strain-relieving boot that snaps onto a rigid portion of the fiber optic connector (e.g., the housing or connector body) and extends rearwardly over a portion of the cable. The boot provides a transition in stiffness between the fiber optic connector and the cable. Although many different boot designs have been proposed to properly provide this transition, new solutions are still desired. It can be difficult to address conflicting conditions at opposite ends of the boot, namely a high stiffness at the end of the boot coupled to the connector and a low stiffness at the end of the boot terminating on the cable. Failure to do so may result in stress concentration points that weaken the boot or otherwise still lead to unacceptable bending of the cable. Existing solutions may not adequately address these conflicting conditions, manufacturability challenges, space constraints, and other considerations.

SUMMARY

Embodiments of strain relief assemblies for fiber optic connectors and fiber optic cable assemblies are disclosed below. According to one embodiment, a strain relief assembly includes a support having a front end, a back end, and an internal cavity extending between the front end and the back end. The strain relief assembly also includes a boot extending over at least a portion of the support and rearwardly from the back end. The support is formed from a first material and the boot is formed from a second material that is less rigid than the first material. The boot includes an internal passageway arranged about a central axis and communicating with the internal cavity of the support. At least part of the boot flares radially outward from the central axis as the boot extends over the at least a portion of the support toward the back end of the support. Additionally, at least part of the boot tapers radially inward toward the central axis as the boot extends rearwardly from the back end of the support.

According to yet another embodiment, a strain relief assembly includes a support having a first portion defining a front end of the support and a second portion defining a back end of the support. The second portion has a stiffness less than the first portion. The strain relief assembly also includes a boot having a first section at least partially extending over the first portion of the support, a second section extending over the second portion of the support, and a third section extending rearwardly from the back end of the support. The support is formed from a first material and the boot is formed from a second material that is less rigid than the first material. Additionally, the first section of the boot has a substantially rectangular tubular configuration, the third section of the boot has a substantially round tubular configuration, and the second section of the boot comprises at least one rib extending along a length of the second section.

According to another embodiment, a strain relief assembly includes a support having a front end, a back end, and an internal cavity extending between the front end and the back end. The strain relief assembly also includes a boot extending over at least a portion of the support and rearwardly from the back end. The boot is less rigid than the support and includes an internal passageway communicating with the internal cavity of the support. Additionally, the boot is arranged about a central axis. The boot bulges radially outward from the central axis as the boot extends over the back end of the support.

Fiber optic connectors including strain relief assemblies are also disclosed. For example, according to one embodiment, a fiber optic connector includes a ferrule configured to support at least one optical fiber, a housing from which the ferrule extends, and one of the strain relief assemblies mentioned in the preceding paragraphs coupled to the housing. The strain relief assembly may be coupled directly to the housing or by way of another component. As an example, the fiber optic connector may also include a ferrule holder supporting the ferrule within the housing and a connector body coupled to the housing. The connector body is configured to retain the ferrule holder within the housing and has a rear portion at least partially outside of the housing. The support of the strain relief assembly may be coupled to the rear portion of the connector body such that the strain relief assembly is coupled to the housing by the connector body.

According to another embodiment, a fiber optic connector includes a ferrule configured to support at least one optical fiber, a housing from which the ferrule extends, a ferrule holder supporting the ferrule within the housing, and a connector body coupled to the housing. The connector body is configured to retain the ferrule holder within the housing and has a rear portion at least partially outside of the housing. The fiber optic connector also includes a strain relief assembly comprising a support coupled to the rear portion of the connector body. The support has a first portion defining a front end of the support and a second portion defining a back end of the support. The second portion of the support has a stiffness less than the first portion of the support. The strain relief assembly also comprises a boot having a first section at least partially extending over the first portion of the support, a second section extending over the second portion of the support, and a third section extending rearwardly from the back end of the support. The support is formed from a first material and the boot is formed from a second material that is less rigid than the first material. Additionally, the first section of the boot has a substantially rectangular tubular configuration, the third section of the boot has a substantially round tubular configuration, and the second section of the boot comprises at least one rib extending along a length of the second section. A shroud of the fiber optic connector is received over the housing, the connector body, and the first section of the boot.

Embodiments of fiber optic cable assemblies are also provided below. The fiber optic cable assemblies include a fiber optic cable having at least one optical fiber. The fiber optic cable assemblies also include one of the fiber optic connectors disclosed herein installed on the fiber optic cable.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

DETAILED DESCRIPTION

Figure 1:
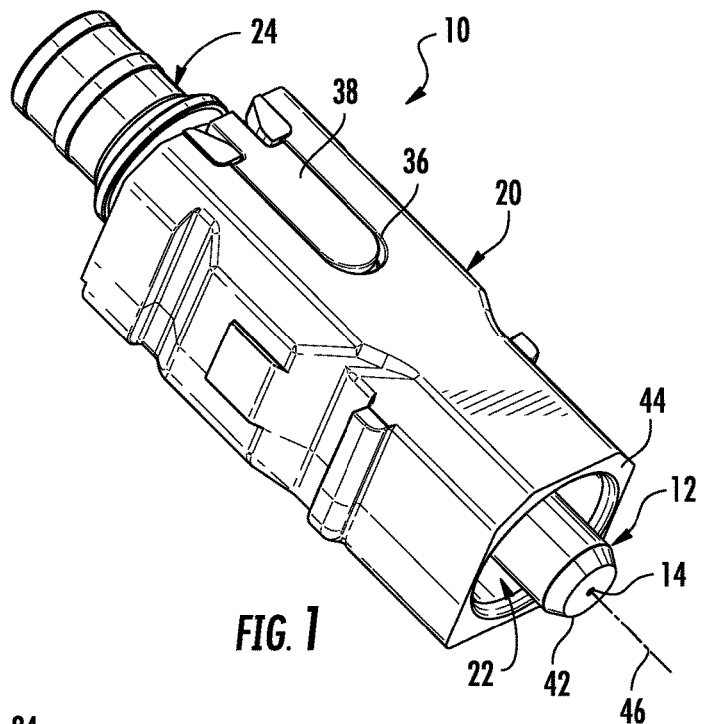
FIG. 1 a perspective view of an example of a fiber optic connector.

Various embodiments will be further clarified by examples in the description below. In general, the description relates fiber optic connectors and cable assemblies including the same. One example of a fiber optic connector 10 (also referred to as "optical connector 10", or simply "connector 10") is shown in FIG. 1. Although the connector 10 is shown in the form of a SC-type connector, the features described below may be applicable to different connector designs. This includes ST, LC, MU, and MPO-type connectors, for example, and other single-fiber or multi-fiber connector designs.

Figure 2:
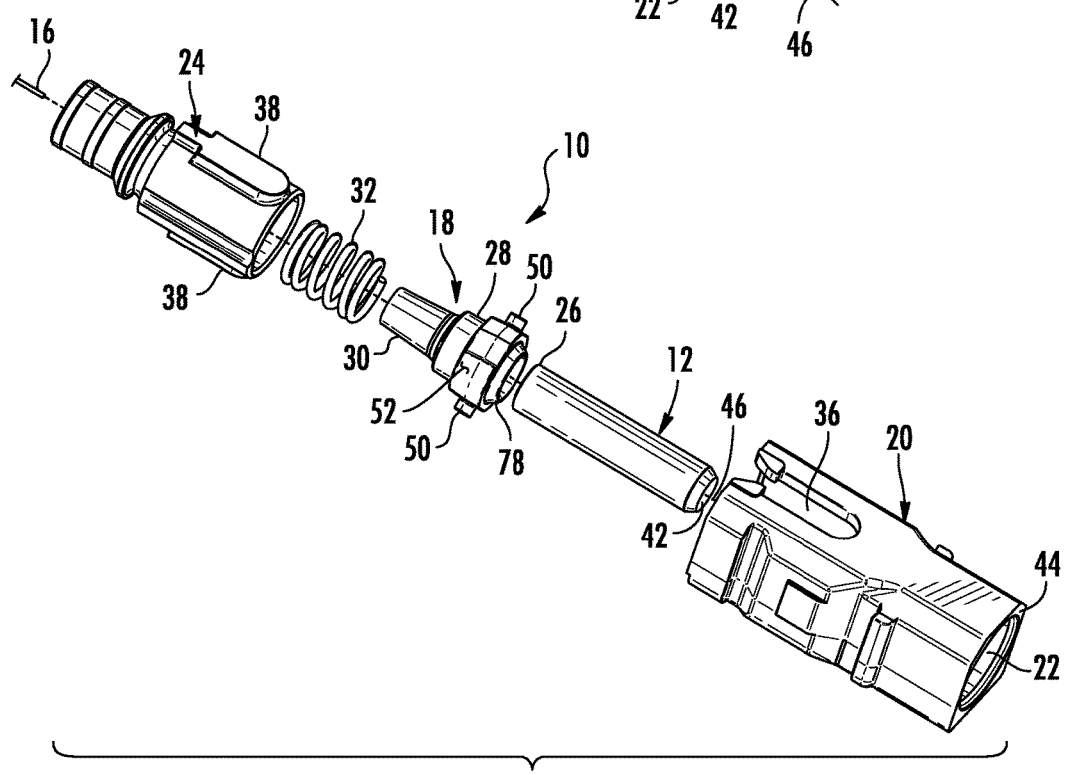
FIG. 2 is an exploded perspective view the fiber optic connector of FIG. 1.

As shown in FIGS. 1 and 2, the connector 10 includes a ferrule 12 having a ferrule bore 14 ("micro-hole") configured to support an optical fiber 16, a ferrule holder 18 from which the ferrule 12 extends, a housing 20 having a cavity 22 in which the ferrule holder 18 is received, and a connector body 24 (also referred to as "inner housing 24", "retention body 24", or "crimp body 24") configured to retain the ferrule holder 18 within the housing 20. More specifically, a back end 26 of the ferrule 12 is received in a first portion 28 of the ferrule holder 18 and is secured therein in a known manner (e.g., press-fit, adhesive, molding the ferrule holder 18 over the back end 26 of the ferrule 12, etc.). The ferrule 12 and ferrule holder 18 may even be a monolithic structure in some embodiments. For convenience, the term "ferrule assembly" may be used to refer to the combination of the ferrule 12 and ferrule holder 18, regardless of whether these elements are separate components secured together or different portions of a monolithic structure.

The ferrule holder 18 is biased to a forward position within the housing 20 by a spring 32, which extends over a second portion 30 of the ferrule holder 18 that has a reduced cross-sectional diameter/width compared to the first portion 28. The spring 32 also interacts with internal geometry of the connector body 24, which may be secured to the housing 20 using a snap-fit or the like. For example, FIGS. 1 and 2 illustrate a rear portion of the housing 20 having cut-outs or slots 36 on opposite sides so as to define a split shroud. The connector body 24 has tabs 38 configured to be snapped into the slots 36 and retained therein due to the geometries of the components.

Figure 3:
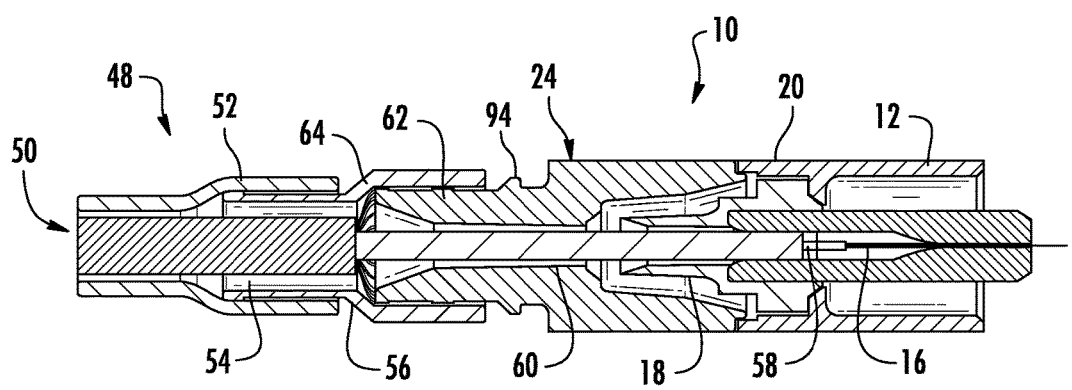
FIG. 3 is schematic cross-sectional view the fiber optic connector of FIG. 1 installed onto a fiber optic cable.

When the connector 10 is assembled as shown in FIG. 1, a front end 42 of the ferrule 12 projects beyond a front end 44 of the housing 20. The front end 42 presents the optical fiber 16 for optical coupling with a mating component (e.g., another fiber optic connector; not shown). Note that the ferrule 12 aligns the optical fiber 16 along a longitudinal axis 46. These aspects can be better appreciated with reference to FIG. 3, which shows how a fiber optic cable 50 (hereinafter "cable 50") including the optical fiber 16 can be terminated with the connector 10. In other words, the connector 10 can be installed on the cable 50 to form a cable assembly 48. The cable 50 is merely an example to facilitate discussion. In the embodiment shown, the cable 50 includes an outer jacket 52, inner jacket 54, strength members 56 in the form of aramid yarn, and the optical fiber 16, which itself includes a coating 58 and a buffer layer 60 ("tight buffer"). Portions of the outer jacket 52 and inner jacket 54 have been removed from the optical fiber 16 to expose the strength members 56, which are cut to a desired length and placed over a rear portion 62 of the connector body 24. The strength members 56 are coupled to the connector body 24 by a crimp band 64 (also referred to as "crimp ring") that has been positioned over the optical fiber 16 and a portion of the strength members 56 and inner jacket 54. Again, the cable 50 is merely an example, as persons skilled in optical connectivity will appreciate how different cable designs may be terminated with the connector 10.

Figure 4:
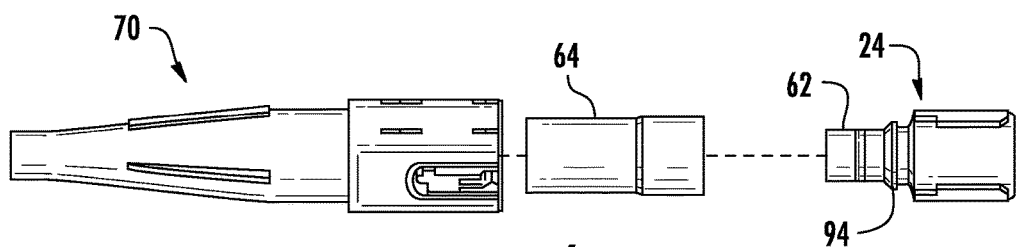
FIG. 4 is an exploded perspective view of a connector body, crimp band, and strain relief assembly for the fiber optic connector of FIG. 1.
Figure 5:
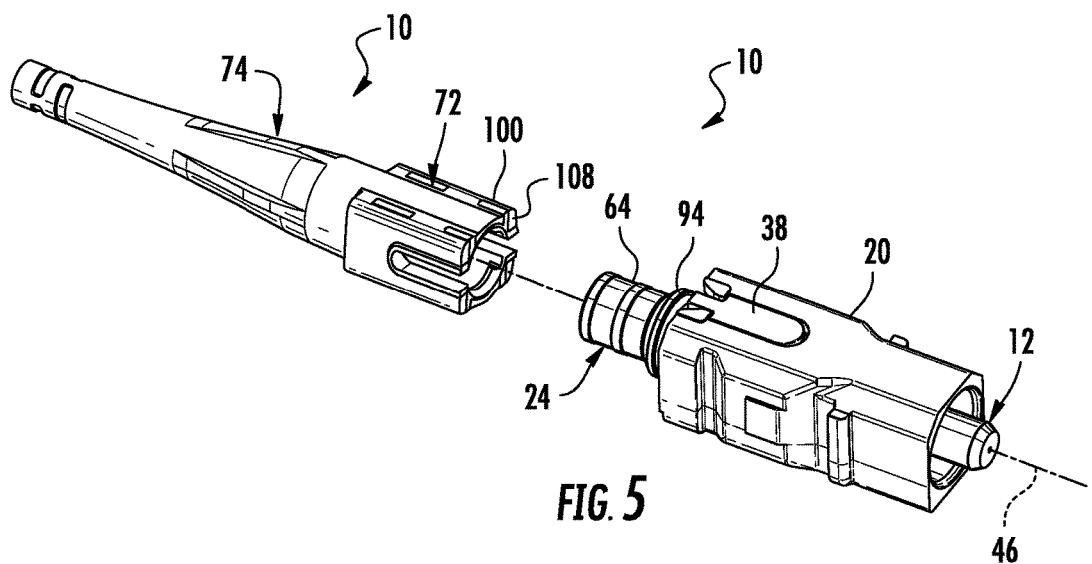
FIG. 5 is a perspective view similar to FIG. 1, but additionally showing the strain relief assembly of FIG. 4 exploded from the fiber optic connector.

In FIG. 4, the connector body 24 and crimp band 64 are shown in isolation with a strain relief assembly 70 of the connector 10. In FIG. 5, the strain relief assembly 70 is shown exploded from the connector 10 (with the crimp band 64 and cable 50 not shown for clarity). The strain relief assembly 70 is positioned over the crimp band 64 and coupled to the connector body 24 when the connector 10 is assembled. More specifically, and with additional reference to FIG. 6, the strain relief assembly 70 includes a support 72 configured to be coupled to the rear portion 62 of the connector body 24 and a boot 74 received over the support 72. The support 72 and boot 74 are formed from respective first and second materials, with the second material being less rigid than the first material. For example, in some embodiments the second material may be an elastomer, such as thermoplastic polyurethane, and the first material may be something having a higher modulus of elasticity and/or shear modulus, such as a polycarbonate or metal. The advantages of such an arrangement will be apparent after further describing other aspects of the strain relief assembly 70 below.

Figure 6:
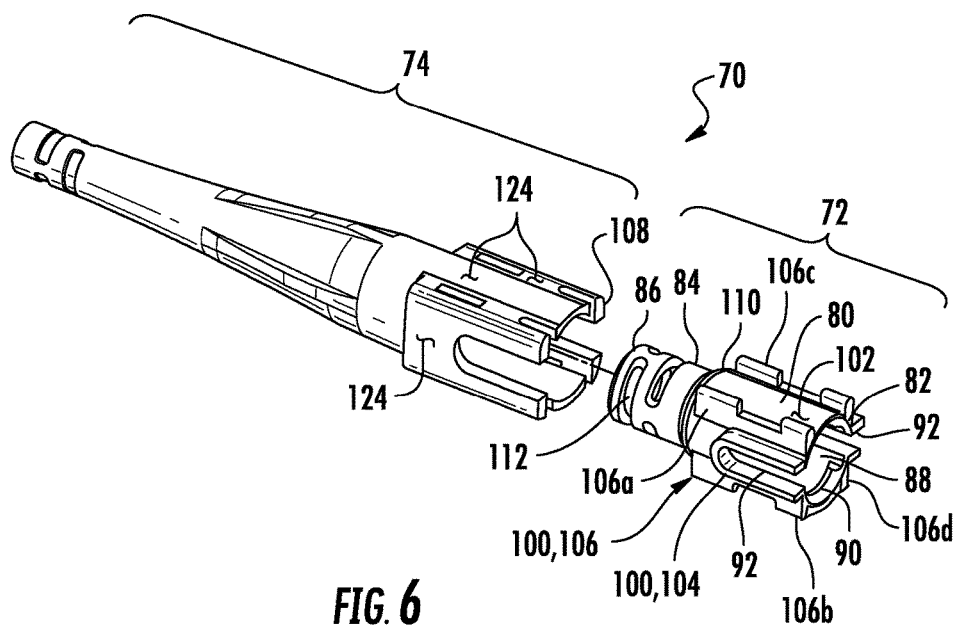
FIG. 6 is an exploded perspective of the strain relief assembly of FIG. 4.

Referring specifically to FIG. 6, the support 72 includes a first portion 80 defining a front end 82 of the support 72 and a second portion 84 defining a back end 86 of the support 72. An internal cavity 88 extends between the front end 82 and back end 86 and thereby defines a passage through the support 72. The first portion 80 represents at least the first quarter of the support 72 in some embodiments, or at least the first third, first half, or first two-thirds of the support 72 in some embodiments. To this end, the first portion 80 is configured to be coupled to the rear portion 62 of the connector body 24. One way in which the coupling may be achieved is by designing the dimensions and geometries of the support 72 and connector body 24 to provide a snap-fit connection. For example, the embodiment shown in the figures includes inwardly-extending latches or ridges 90 in the internal cavity 88 adjacent the front end 82 of the support 72. Slots 92 extending rearwardly from the front end 82 are provided on opposite sides of the first portion 80. The slots 92 facilitate the first portion 80 flexing outwardly so that the latches 90 can be moved over a ridge 94 (FIGS. 3-5) on the rear portion 64 of the connector body 24. The relationship between the ridge 94 and latches 90 helps retain the support 72 (and, therefore, strain relief assembly 70) on the connector body 24 under normal loads.

The first portion 80 of the support 72 further includes at least one rib 100 (also referred to as a "fin") on an outer surface 102 of the support 72. Two types of ribs 100 are provided in the embodiment shown. First, walls 104 on the support 70 that border the slots 92 may be considered ribs. Second, projections 106 on the outer surface 102 that do not border the slots 92 may be considered ribs. Four projections 106 are shown in this example: first and second projections 106a, 106b on the side of the first portion including one of the slots 92, and third and fourth projections 106c, 106d on the side of the first portion including the other slot 92. The projections 106 are generally planar and aligned (e.g., the first and second projections 106a, 106b are co-planar, as are the third and fourth projections 106c, 106d) or parallel to each other (e.g., the first and second projections 106a, 106b are parallel with the third and fourth projections 106c, 106d). Other embodiments may include only one or more walls 104 or only one more projections 106 as the one or more ribs 100, and the ribs need not be aligned and/or parallel when multiple ribs are provided in some embodiments. As will be described in greater detail below, the ribs 100 extend through a wall 108 of the boot 74 when the boot 74 is received over the support 72.

Still referring to FIG. 6, the second portion 84 of the support 72 has a different geometry than the first portion 80. As such, a transition region or portion 110 is defined between the first and second portions 80, 84. The second portion 84 has a stiffness less than the first portion 80, which may be achieved by making the second portion 84 shorter in length and/or smaller in diameter/width than the first portion 80. Additionally, the second portion 84 may include structural features along its length that result in lower stiffness than the first portion 80. For example, the second portion 84 in the embodiment shown is cylindrical, aligned with the longitudinal axis 46 (FIG. 1), and has a plurality of lateral openings 112 along its length. The lateral openings 112 extend in a circumferential direction in the embodiment shown so as to comprise circumferentially-extending slots in the second portion 84. To this end, the second portion 84 appears "segmented". Other shapes and configurations are possible, however. Indeed, in alternative embodiments, the second portion 84 may not have any lateral openings or only have a single lateral opening extending circumferentially and/or axially.

Now referring to both FIGS. 5 and 6, the boot 74 is substantially longer than (e.g., at least twice the length of) the support 72 and similarly includes at least two sections having different geometries. At least part of the boot 74 that is received over the first portion 80 of the support 72 has a substantially rectangular cross-sectional profile when viewed along the longitudinal axis 46. As used herein, "substantially rectangular" refers to shapes having four discernible sides at right angles to each other. The sides need not be perfectly planar. For example, "substantially rectangular" may include shapes that are within a region defined by two concentric rectangles. The two concentric rectangles have side edges that differ by less than 20% such that the region is small enough to discern the four sides mentioned above. Additionally, cross-sectional profile refers to the general outline of a cross-section.

Still referring to FIGS. 5 and 6, the boot 74 extends rearwardly from the support 72 and eventually terminates with a circular or substantially circular or otherwise round profile when viewed along the longitudinal axis 46. Accordingly, the boot 74 transitions from the rectangular or substantially rectangular profile to the round or substantially round profile as the boot 74 extends rearwardly from the first portion 80 of the support 72. As used herein, "substantially round" refers to shapes that are within a region defined by two concentric circles or ellipses. The two circles or ellipses have radial dimensions that differ by less than 20%.

The boot 74 may be over-molded onto the support 72 to be received thereon, although other methods of securing the boot 74 to the support 72 will be appreciated. Regardless of how the boot 74 is formed, the boot 74 includes an internal passageway communicating with the internal cavity of the support. Together, the internal cavity and internal passageway define a passage through the strain relief assembly.

Figure 7:
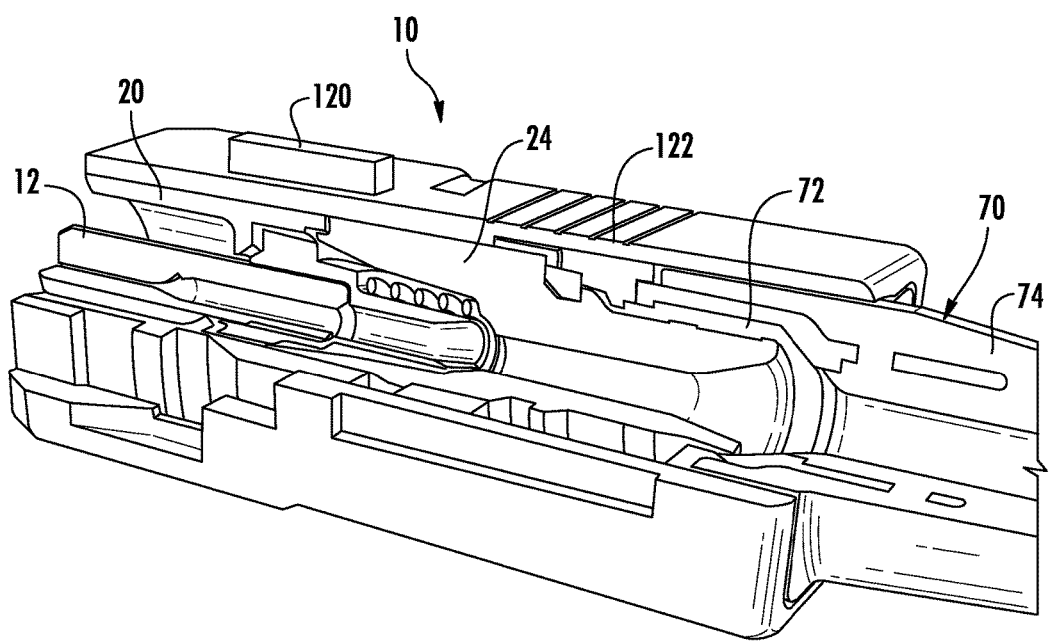
FIG. 7 is a perspective view, partially in cross-section, of the fiber optic connector of FIG. 1 including the strain relief assembly of FIG. 4 and a shroud.

As mentioned above, the rib(s) 100 on the first portion 80 of the support 72 extend through a wall 108 of the boot 74 at one or more locations. This can be better appreciated with reference to FIG. 7, which illustrates the connector 10 in an assembled condition and partially in cross-section. As shown in FIG. 7, the connector 10 may further include a shroud 120 received over the housing 20, connector body 24, and at least a portion of the strain relief assembly 70. The shroud 120 in the particular embodiment shown extends over the entire first portion 80 of the support 72 and, therefore, the section of the boot 74 that is received over the first portion 80. The boot 74 extends from the front end 82 of the support 72 and rearwardly over the first portion 80 in the embodiment shown, but other arrangements are possible. For example, the boot 74 may be received only over at least 75% of the first portion 80 of the support 72 in some embodiments, or only over at least 50% of the first portion 80 in some embodiments. Regardless, at least some of the boot 74 is positioned between the first portion 80 of the support 72 and the shroud 120. Inner surfaces 122 of the shroud 120 confront the outer surfaces 124 (FIG. 6) of the boot 74. Each rib 100 on the first portion 80 of the support 72 extends through the wall 108 of the boot 74 toward one of the inner surfaces 122. In some embodiments, the ribs 100 may even contact the associated inner surface 122 of the shroud 120.

By extending to or beyond an outer surface of the boot 74, the ribs 100 allow forces to be effectively transferred to the shroud 120 during use. For example, when a radial/side load is applied to the cable 50 (FIG. 3), the coupling between the strain relief assembly 70 and connector body 24 may experience less stress due to the force transfer to the shroud 120. This reduces the likelihood of the strain relief assembly 70 bending or otherwise deforming beyond an acceptable level (e.g., the minimum bend radius of the optical fiber 16).

Although the ribs 100 may be one feature that increases the support capability of the strain relief assembly 70 compared to conventional designs, on a more general level simply providing the strain relief assembly 70 with components formed from different materials—one being more rigid than the other—offers advantages with respect to stiffness. In particular, the rigid first material of the support 72 helps ensure that the portion of the strain relief assembly 70 that couples to the connector body 24 has a relatively high stiffness. This avoids a significant/sharp transition in stiffness between the connector body 24 and strain relief assembly 70, thereby reducing the concentration of stresses at the coupling when the cable 50 experiences side loads or other forces.

Moreover, the relatively high stiffness can be provided without sacrificing a smooth transition in stiffness at the other end of the strain relief assembly 70 between the end of the boot 74 and the cable 50. In other words, the strain relief assembly 70 is still able to transition to a sufficiently low stiffness in an acceptable amount of length due to its construction. The geometry of the support 72 is such that the second portion 84 has a lower stiffness than the first portion 80, thereby providing a transition in stiffness between the rigid material of the support 72 and the less rigid material of the boot 74. Thus, within the strain relief assembly 70 itself, the potential for stress concentrations due to sharp transitions in stiffness between the support 72 and boot 74 is reduced/minimized.

Figure 8:
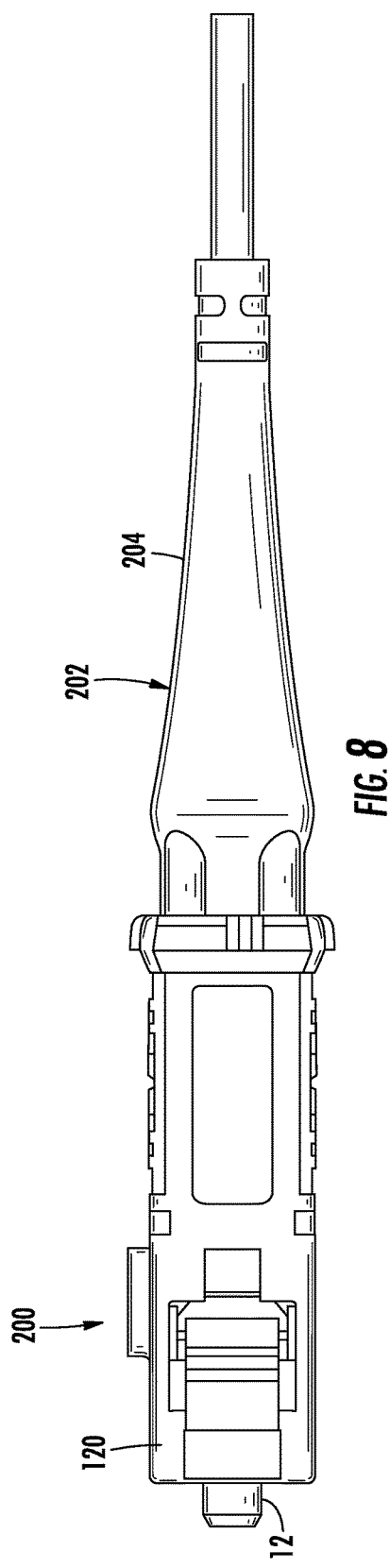
FIG. 8 is a side elevation view of a fiber optic connector according to another embodiment.
Figure 9:
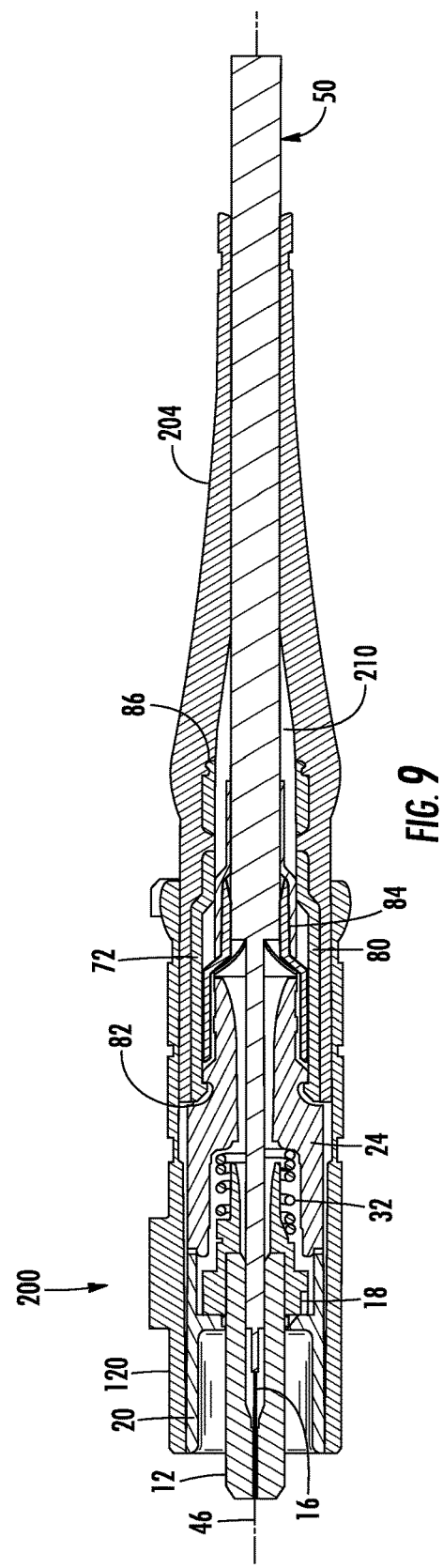
FIG. 9 is a cross-sectional view of the fiber optic connector of FIG. 8.

To even further improve the transition in stiffness between the support 72 and the boot 74, the boot 74 may be provided with a different geometry. One example of a fiber optic connector 200 ("connector 200") with an alternative strain relief assembly 202 is shown in FIGS. 8 and 9. The strain relief 202 assembly includes the support 72 and a boot 204 that bulges radially outward as the boot 204 extends over the back end 86 of the support 72. The boot 204 may be received on the support 74 in the same manner as the boot. Indeed, the description above for the connector 10—including the potential variations—applies equally the connector 200, and the same reference numbers are used in the figures to refer to corresponding elements. To simplify matters, only the different geometry of the boot 204 will be described.

As shown in FIG. 9, the boot 204 includes an internal passageway 210 arranged about a central axis, which may correspond to the longitudinal axis 46 when the connector 200 is assembled. For convenience, reference number 46 will be used to refer to both the central axis of the boot 204 and the longitudinal axis of the connector 200 even though embodiments are possible where the central axis may not exactly correspond to the longitudinal axis. The internal passageway 210 communicates with the internal cavity 88 of the support 72. Together, the internal passageway 210 and internal cavity 88 define the internal passage through the strain relief assembly 202.

In the embodiment shown in FIGS. 8 and 9, at least part of the boot 204 flares radially outward from the central axis 46 as the boot 204 extends over the second portion 84 of the support 72 and toward the back end 86 of the support 72. Additionally, all or part of the boot 204 tapers radially inward toward the central axis 46 as the boot 204 extends rearwardly from the back end 86 of the support 72. The extent of the flare radially outward and the taper radially inward depends on the particular embodiment. For example, the boot 204 can be considered to have a width in a plane perpendicular to the central axis 46 ("transverse plane"), with the width being measured through the central axis 46. The width corresponds to an outer diameter when the boot 204 has a substantially round cross-sectional profile in the transverse plane. The width may correspond to a bisecting line when the boot 204 has a substantially rectangular cross-sectional profile in the transverse plane.

In some embodiments, the part(s) of the boot 204 that flare radially outward from the central axis 46 may increase in width by at least 20%. Also, in some embodiments, the part(s) of the boot 204 that taper radially inward toward the central axis 46 may decrease in width by at least 50%. In the embodiment shown in FIGS. 8 and 9, the sections of the boot 204 extending over and rearwardly from the second portion 84 of the support 72 have a substantially round tubular configuration (i.e., a tubular configuration that has substantially round cross-sectional profiles when viewed along the central axis 46 at different axial locations). A small section of the boot 204 flares radially outward from the central axis 46, and then a long section of the boot 204 (e.g., substantially the remaining length of the boot 204) tapers radially inward toward the central axis 46. The width of the boot 204 is greatest at a location along the boot 204 that substantially corresponds to where the boot 204 extends over the back end 86 of the support 72. The same may be true in embodiments where the boot 204 flares radially outward and tapers radially inward in a different manner.

Figure 10:
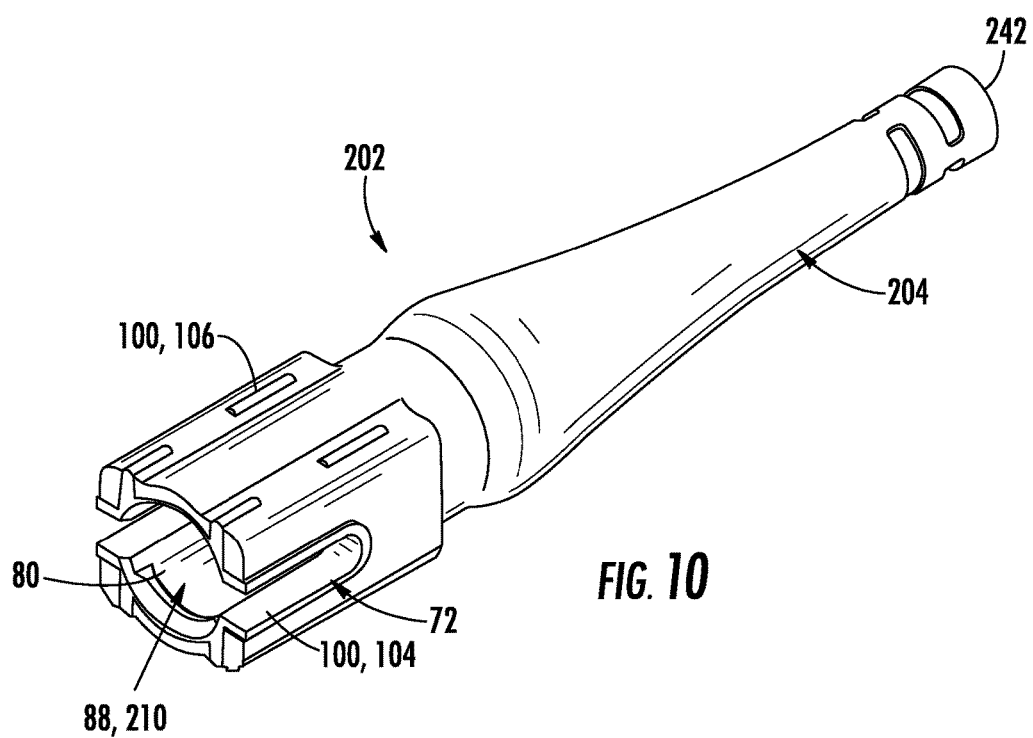
FIG. 10 is a perspective view of a strain relief assembly in the fiber optic connector of FIG. 8.
Figure 11:
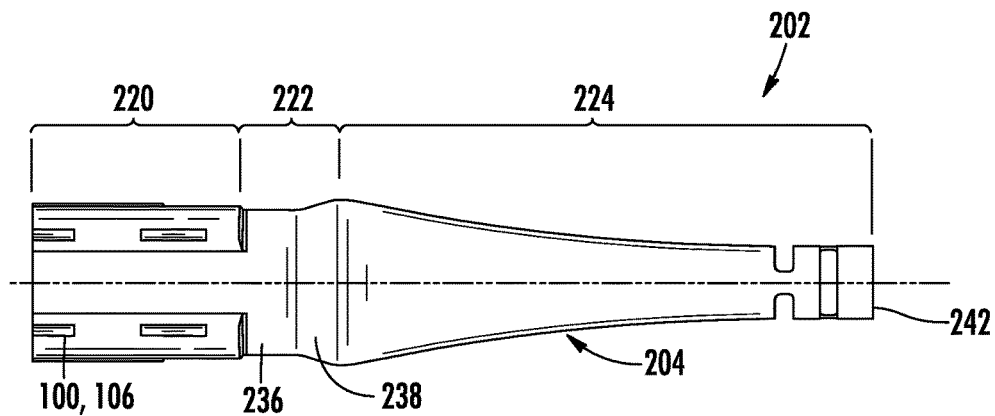
FIG. 11 is a top plan view of the strain relief assembly of FIG. 10.
Figure 12:
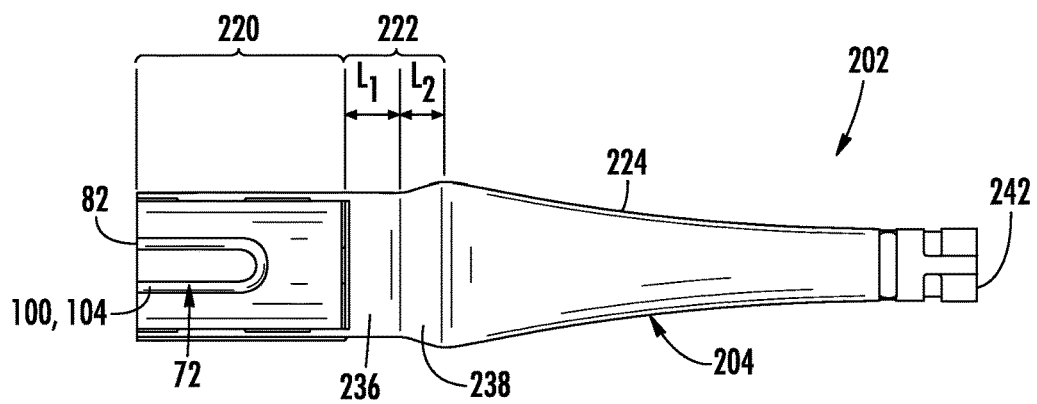
FIG. 12 is a side elevation view of the strain relief assembly of FIG. 10.
Figure 13:
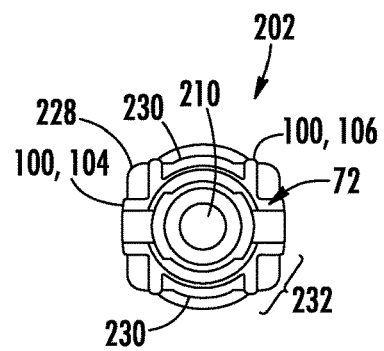
FIG. 13 is a front elevation view of the strain relief assembly of FIG. 10.

To further characterize the different geometry of the boot 204, reference will now be additionally made to FIGS. 10-13. FIG. 10 is a perspective view of the strain relief assembly 202 in isolation. FIGS. 11, 12, and 13 are respective top plan, side elevation, and front elevation views of the strain relief assembly 202.

As shown in FIGS. 8-13, the boot 204 includes a first section 220 extending over the first portion 80 of the support 72, a second section 222 extending over the second portion 84 of the support 72, and a third section 224 extending rearwardly from the back end 86 of the support 72. The first section 220, second section 222, and third section 224 have different tubular configurations. In other words, the first section 220, second section 222, and third section 224 are each tube-like (e.g., each defines a portion of the internal passageway 210), yet the shapes of the tubes are different.

In the example shown, the first section 220 has a substantially rectangular tubular configuration as discussed above. Four corners 228 are clearly defined by the substantially rectangular tubular configuration, even though the corners 228 are rounded in the particular embodiment shown. Additionally, even though the first section 220 may include rounded portions or humps 230 on sides between the four corners 228, the first section 220 is still considered to have a substantially rectangular cross-sectional profile when viewed along the central axis 46. As mentioned above, "substantially rectangular" refers to a shape that fits within two concentric rectangles whose side edges differ in length by less than 20%.

An additional or alternative way to characterize the shape of the first section 220 of the boot 204 may include reference to the support 72. For example, FIG. 13 illustrates how the plurality of ribs/fins 100 on the first portion 80 of the support 72 extend through the first section 220 of the boot 204. The ribs 100 define four corner regions 232 in the first section 220 of the boot 204. The corner regions 232 include the respective corners 228 in the embodiment shown. In alternative embodiments, the first section 220 may not have a substantially rectangular tubular configuration yet still include corner regions defined between the ribs 100 on the first portion 80 of the support 72.

Now referring to FIGS. 11 and 12, the second section 222 of the boot 204 has the substantially round tubular configuration mentioned above in connection with FIGS. 8 and 9. More specifically, in the embodiment shown, the second section 222 includes a neck portion 236 and a flared portion 238 as the second section 222 extends over the second portion 84 of the support 72. The neck portion 236 maintains a substantially constant cross-sectional profile when viewed along the central axis 46. Indeed, the neck portion 236 in the embodiment shown has a substantially cylindrical tubular configuration. The flared portion 238 increases the diameter of the second section 222 to provide a transition between the neck portion 236 and the location where the boot 204 has a maximum width. That location, as mentioned above, may substantially correspond to where the boot 204 extends over the back end 86 of the support 72.

The neck portion 236 and the flared portion 238 of the second section 222 have respective first and second lengths $L_1$, $L_2$ measured along the central axis 46. The first length $L_1$ is greater than the second length $L_2$ in the embodiment shown, but in other embodiments the flared portion 238 may be longer than the neck portion 236. Indeed, in some embodiments, the entire length of the second section 222 may be flared such that there is no neck portion.

The third section 224 of the boot 204 defines a distal or terminal end 242 of the boot 204. Similar to the second section 222, the third section 224 has the substantially round tubular configuration mentioned above in connection with FIGS. 8 and 9. The third section 224 gradually tapers radially inward toward the central axis 46 such that the round tubular configuration decreases in diameter along substantially all of the length of the third section 224.

The "flared" or "bulged" shaped of the boot 204 may help improve the transition in stiffness between the support 72 and the boot 204, as mentioned above. As a result, the strain relief assembly 202 may be less likely to experience unacceptable stress concentrations when subjected to side loads or the like.

Figure 14:
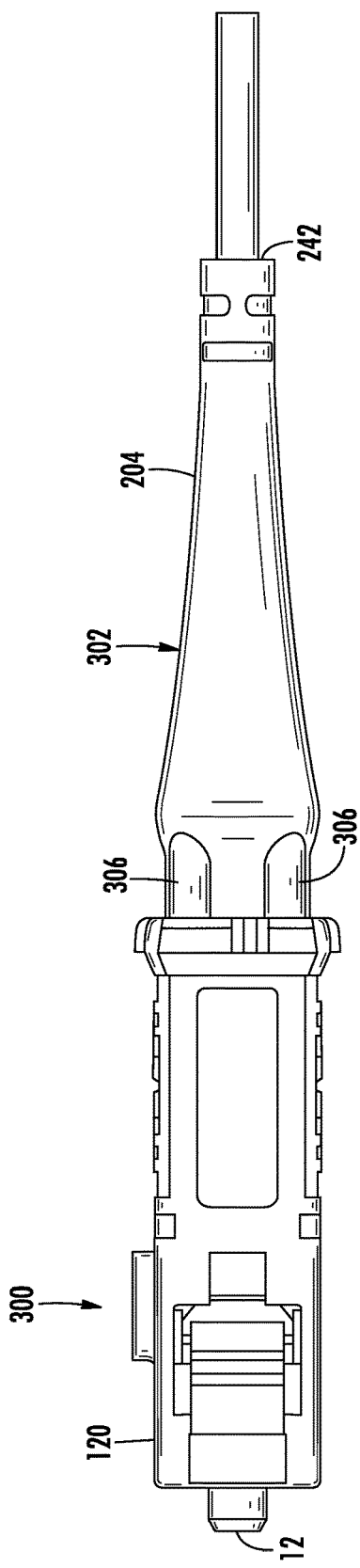
FIG. 14 is a side elevation view of a fiber optic connector according to yet another embodiment.
Figure 15:
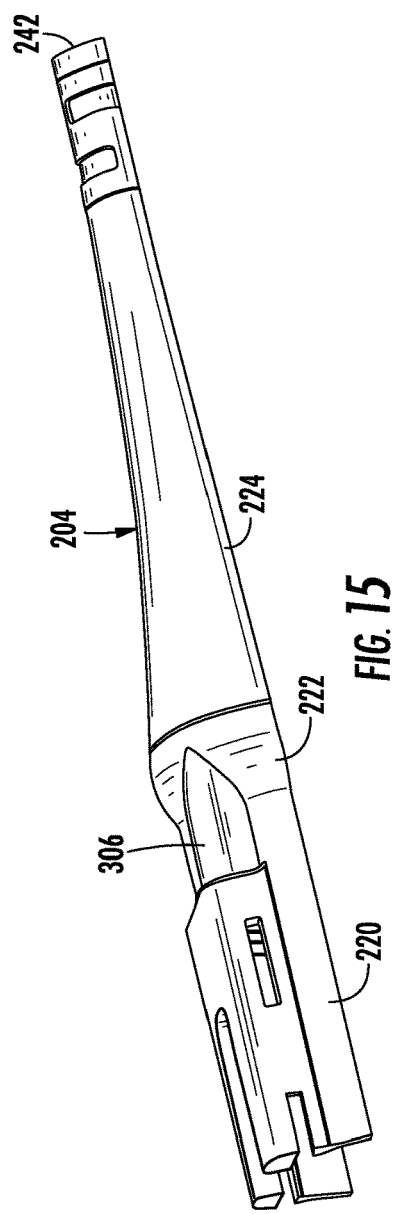
FIG. 15 is a perspective view, partially cut-away, of a strain relief assembly in the fiber optic connector of FIG. 14.

Side load performance may be even further improved by incorporating additional or alternative features on the second section 222 of the boot 204. For example, FIGS. 14 and 15 illustrate a fiber optic connector 300 ("connector 300") with a strain relief assembly 302 similar to the strain relief assembly 202. The only difference is that the second section 222 of the boot 204 in the strain relief assembly 302 includes ribs 306 extending along a length of the second section 222. Four ribs 306 are provided in the embodiment shown, with each of the ribs 306 being circumferentially aligned with one of the corners 228 of the first section 220 of the boot 204. In alternative embodiments, there may be a greater or lesser number of the ribs 306, and each of the ribs 306 may or may not be circumferentially aligned with one of the corners 228. Similar statements apply with respect to the corner regions 232. That is, each of the ribs 306 is circumferentially aligned with one of the corner regions 232 in the embodiment shown, but there may more or less ribs 306 in alternative embodiments that may or may not be aligned with the corner regions 232 of the first section 220.

The improved stiffness, side load performance, and other advantages may be provided without changing the spatial constraints of the strain relief assembly and/or other components of the connector 10. For example, the shroud 120 of the connectors 10, 200, 300 may be a conventional shroud, and the strain relief assemblies 70, 202, 302 may be comparable in size to a conventional, monolithic strain relief structure (e.g., an elastomeric boot alone). Over-molding the boots 74, 204 onto the support 72 is one way to achieve this advantage. Regardless of how the boots are received and retained on the support 72, a sufficient length of the boot is positioned between the first portion 80 of the support 72 and the shroud 120 so that the overall length of the strain relief assembly 70 is not significantly increased, if at all, compared to conventional designs. In the embodiments described above, the boots 74, 204 extend from the front end 82 of the support 72 and rearwardly over the first and second portions 80, 84. In other embodiments, the boots 74, 204 may be received over the support 72 to a lesser extent. For example, in some embodiments the boots 74, 204 may only be received over at least 75% of the first portion 80, or only over at least 50% of the first portion 80.

Those skilled in the art will appreciate that other modifications and variations can be made without departing from the spirit or scope of the invention. For example, the ribs 306 in the embodiment shown in FIGS. 14 and 15 may be included in boot configurations that do not bulge or flare radially outward, such as the boot 74. Since modifications, combinations, sub-combinations, and variations of the disclosed embodiments incorporating the spirit and substance of the invention may occur to persons skilled in the art, the invention should be construed to include everything within the scope of the appended claims and their equivalents.

What is claimed is:

1. A strain relief assembly for a fiber optic connector, comprising:
   a support having a front end, a back end, and an internal cavity extending between the front end and the back end; and
   a boot extending over at least a portion of the support and rearwardly from the back end;
   wherein:
      the support is formed from a first material and the boot is formed from a second material that is less rigid than the first material;
      the boot includes an internal passageway arranged about a central axis and communicating with the internal cavity of the support;
      at least part of the boot flares radially outward from the central axis as the boot extends over the at least a portion of the support toward the back end of the support; and
      at least part of the boot tapers radially inward toward the central axis as the boot extends rearwardly from the back end of the support;
   and further wherein:
      the support includes a first portion defining the front end of the support and a second portion defining the back end of the support, the second portion of the support having a stiffness less than the first portion of the support;
      the boot includes a first section at least partially extending over the first portion of the support, a second section extending over the second portion of the support, and a third section extending rearwardly from the back end of the support; and
      the first section, second section, and third section of the boot have different tubular configurations.

2. The strain relief assembly of claim 1, wherein:
   the boot has a width measured in a radial direction relative to the central axis; and
   the at least a part of the boot that flares radially outward from the central axis increases in width by at least 20%.

3. The strain relief assembly of claim 2, wherein the at least a part of the boot that tapers radially inward toward the central axis decreases in width by at least 50%.

4. The strain relief assembly of claim 1, wherein:
   the boot has a width measured in a radial direction relative to the central axis; and
   the width is greatest at a location along the boot that substantially corresponds to where the boot extends over the back end of the support.

5. The strain relief assembly of claim 4, wherein at the location along the boot that substantially corresponds to where the boot extends over the back end of the support, the boot has a substantially round cross-sectional profile when viewed along the central axis.

6. The strain relief assembly of claim 1, wherein the boot includes a distal end rearward of the support, and wherein the boot has a substantially round tubular configuration between at least the back end of the support and the distal end of the boot.

7. The strain relief assembly of claim 6, wherein at least a section of the boot that extends over the support has a substantially rectangular tubular configuration.

8. The strain relief assembly of claim 7, wherein at least 50% of the boot that extends over the support has a substantially rectangular tubular configuration.

9. The strain relief assembly of claim 1, wherein:
   the second section of the boot includes a neck portion and a flared portion as the second section extends over the second portion of the support; and
   the neck portion maintains a substantially constant cross-sectional profile when viewed along the central axis.

10. The strain relief assembly of claim 9, wherein the neck portion and the flared portion have respective first and second lengths measured along the central axis, and wherein the first length is greater than the second length.

11. The strain relief assembly of claim 1, wherein:
    the first section of the boot has a substantially rectangular tubular configuration;
    the third section of the boot has a substantially round tubular configuration; and
    the second section of the boot comprises at least one rib extending along a length of the second section.

12. The strain relief assembly of claim 11, wherein:
    the first section of the boot includes four corners defined by the substantially rectangular tubular configuration of the first section; and
    the at least one rib of the second section comprises four ribs that are each circumferentially aligned with one of the corners of the first section.

13. The strain relief assembly of claim 1, wherein:
    the first portion of the support includes a plurality of projections extending through the first section of the boot;
    the plurality of projections define four corner regions in the first section of the boot;
    the second section of the boot comprises four ribs extending along a length of the second section; and
    the four ribs of the second section are circumferentially aligned with the four corner regions of the first section.

14. A fiber optic connector, comprising:
    a ferrule configured to support at least one optical fiber;
    a housing from which the ferrule extends; and
    a ferrule holder supporting the ferrule within the housing;
    a connector body coupled to the housing and configured to retain the ferrule holder within the housing, the connector body having a rear portion at least partially outside of the housing; and
    a strain relief assembly coupled to the housing, wherein the strain relief assembly comprises:
       a support having a front end, a back end, and an internal cavity extending between the front end and the back end, wherein the support of the strain relief assembly is coupled to the rear portion of the connector body such that the strain relief assembly is coupled to the housing by the connector body; and
       a boot extending over at least a portion of the support and rearwardly from the back end;
    wherein:
       the support is formed from a first material and the boot is formed from a second material that is less rigid than the first material;

the boot includes an internal passageway arranged about a central axis and communicating with the internal cavity of the support;

at least part of the boot flares radially outward from the central axis as the boot extends over the at least a portion of the support toward the back end of the support; and at least part of the boot tapers radially inward toward the central axis as the boot extends rearwardly from the back end of the support.

15. A strain relief assembly for a fiber optic connector, comprising:

a support having a first portion defining a front end of the support and a second portion defining a back end of the support, the second portion having a stiffness less than the first portion; and a boot having a first section at least partially extending over the first portion of the support, a second section extending over the second portion of the support, and a third section extending rearwardly from the back end of the support;

wherein:

the support is formed from a first material and the boot is formed from a second material that is less rigid than the first material;

the first section of the boot has a substantially rectangular tubular configuration;

the third section of the boot has a substantially round tubular configuration; and the second section of the boot comprises at least one rib extending along a length of the second section.

16. The strain relief assembly of claim 15, wherein:

the support includes an internal cavity extending between the front end and the back end;

the boot includes an internal passageway arranged about a central axis and communicating with the internal cavity of the support;

at least part of the second section and third section of the boot are shaped so that the boot bulges radially outward from the central axis as the boot extends over the back end of the support.

17. The strain relief assembly of claim 15, wherein:

the first section of the boot includes four corners defined by the substantially rectangular tubular configuration; and the at least one rib of the second section of the boot comprises four ribs that are each circumferentially aligned with one of the corners of the first section of the boot.

18. The fiber optic connector of claim 14, wherein:

the boot has a width measured in a radial direction relative to the central axis; and the width is greatest at a location along the boot that substantially corresponds to where the boot extends over the back end of the support.

19. The fiber optic connector of claim 18, wherein at the location along the boot that substantially corresponds to where the boot extends over the back end of the support, the boot has a substantially round cross-sectional profile when viewed along the central axis.

20. The fiber optic connector of claim 19, wherein:

the first section of the boot has a substantially rectangular tubular configuration that defines four corners of the first section;

the second section of the boot comprises four ribs that are each circumferentially aligned with one of the corners of the first section and that each extend along a length of the second section; and the third section of the boot has a substantially round tubular configuration.

* * * * *